United States Patent
Kasbeer-Betty et al.

(10) Patent No.: US 8,052,335 B2
(45) Date of Patent: Nov. 8, 2011

(54) EJECTOR APPARATUS AND ASSOCIATED ASSEMBLY METHOD FOR PLUGGABLE TRANSCEIVERS

(75) Inventors: Rebecca Anne Kasbeer-Betty, Windsor Mill, MD (US); Basil Oscar Perez, Lawrenceville, GA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 12/434,119

(22) Filed: May 1, 2009

(65) Prior Publication Data

US 2010/0278539 A1   Nov. 4, 2010

(51) Int. Cl.
*G02B 6/36* (2006.01)
*G02B 6/12* (2006.01)

(52) U.S. Cl. ............................ 385/92; 385/14
(58) Field of Classification Search .............. 385/92, 385/14
See application file for complete search history.

(56) References Cited

U.S. PATENT DOCUMENTS

| | | | | |
|---|---|---|---|---|
| 5,579,425 | A * | 11/1996 | Lampert et al. | 385/59 |
| 6,434,015 | B1 * | 8/2002 | Hwang | 361/754 |
| 6,666,484 | B1 * | 12/2003 | Branch et al. | 292/128 |
| 6,698,937 | B2 * | 3/2004 | Grimes et al. | 385/53 |
| 6,749,448 | B2 * | 6/2004 | Bright et al. | 439/160 |
| 6,819,568 | B2 * | 11/2004 | Cao | 361/728 |
| 6,881,095 | B2 * | 4/2005 | Murr et al. | 439/607.2 |
| 6,916,123 | B2 * | 7/2005 | Kruger et al. | 385/92 |
| 7,023,704 | B1 * | 4/2006 | Zarnowitz et al. | 361/754 |
| 7,090,523 | B2 * | 8/2006 | Shirk et al. | 439/352 |
| 7,114,984 | B2 * | 10/2006 | Shirk et al. | 439/372 |
| 7,314,384 | B2 * | 1/2008 | Togami et al. | 439/484 |
| 7,325,975 | B2 * | 2/2008 | Yamada et al. | 385/54 |
| 7,455,463 | B2 * | 11/2008 | Togami et al. | 385/93 |
| 2003/0012512 | A1 * | 1/2003 | Grimes et al. | 385/53 |
| 2003/0198025 | A1 * | 10/2003 | Cao | 361/728 |
| 2004/0077226 | A1 * | 4/2004 | Murr et al. | 439/701 |
| 2004/0101257 | A1 * | 5/2004 | Kruger et al. | 385/92 |

(Continued)

OTHER PUBLICATIONS

Small Form-factor Pluggable (SEP) Transceiver MultiSource Agreement (MSA); Cooperation Agreement for Small Form-Factor Pluggable Transceivers; Agilent Technologies, Blaze Network Products, E2O Communications, Inc., ExceLight Communications, Finisar Corporation, Fujikura Technology America Corp., Hitachi Cable, Infineon Technologies Corp., IBM Corp., Lucent Technologies, Molex, Inc., Optical Communication Products, Inc., Picolight, Inc., Stratos Lightwave, Tyco Electronics; Sep. 14, 2000.

(Continued)

*Primary Examiner* — K. Cyrus Kianni
(74) *Attorney, Agent, or Firm* — Clements Bernard PLLC; Christopher L. Bernard; Lawrence A. Baratta, Jr.

(57) ABSTRACT

The present disclosure relates to a novel ejector apparatus for pluggable transceivers, such as transceivers defined by multi-source agreements (MSAs) including SFP, SFP+, XFP, and the like. The ejector apparatus utilizes a shrouded design where the ejector apparatus encapsulates the top, sides, and bottom of a pluggable transceiver thereby allowing an operator to grasp any side of the ejector apparatus to actuate engagement prongs. In keeping with MSA guidelines, the ejector apparatus utilizes prongs to disengage a locking mechanism in order for the kick out springs to release the module. Advantageously, the ejector apparatus enables high density placement of corresponding transceivers, allows access from all sides of the transceiver for ejection, and allows cables to remain connected to the transceiver during ejection.

10 Claims, 9 Drawing Sheets

U.S. PATENT DOCUMENTS

| | | | |
|---|---|---|---|
| 2005/0003696 A1* | 1/2005 | Shirk et al. | 439/352 |
| 2005/0141827 A1 | 6/2005 | Yamada et al. | |
| 2005/0286906 A1* | 12/2005 | Togami et al. | 398/164 |
| 2007/0059953 A1* | 3/2007 | Togami et al. | 439/76.1 |
| 2009/0227133 A1* | 9/2009 | Zhang et al. | 439/160 |

OTHER PUBLICATIONS

Tyco Electronics—Computer, Communications, and Consumer Electronics; SFP Products presentation.

* cited by examiner

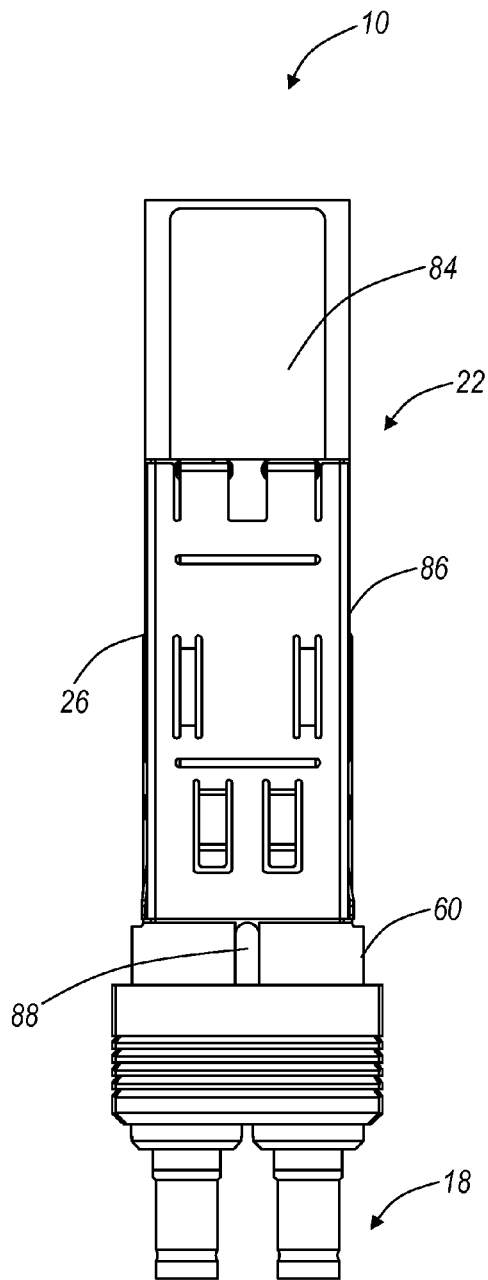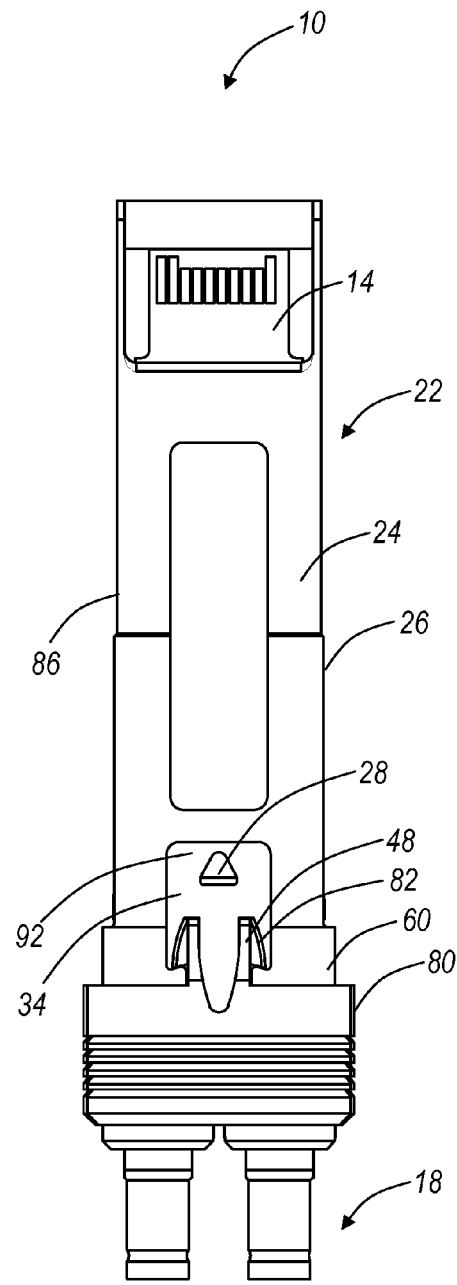
FIG. 5
FIG. 6

the SFP, but is soldered to the host board as a pin through-hole device, rather than plugged into an edge-card socket. Small form-factor pluggable transceivers offer a great deal of flexibility in limited spatial constraints. The ability to densely populate such transceivers is highly marketable for to add system capacity.

EJECTOR APPARATUS AND ASSOCIATED ASSEMBLY METHOD FOR PLUGGABLE TRANSCEIVERS

FIELD OF THE INVENTION

The present invention relates generally to networking devices. More particularly, the present invention relates to a novel ejector apparatus for pluggable transceivers, such as transceivers defined by multi-source agreements (MSAs) including SFP, SFP+, XFP, and the like.

BACKGROUND OF THE INVENTION

A variety of devices utilize pluggable transceivers to provide connectivity. Exemplary devices include optical network elements (SONET, SDH, OTN, etc.), Ethernet switches, routers, video devices, and the like. In an effort to decouple transceiver design and manufacturing from the underlying devices, various multi-source agreements (MSAs) have been defined to standardize pluggable transceivers. MSAs are agreements for specifications of transceivers agreed to by two or more vendors and promulgated for other vendors and network operators to utilize. MSAs allow other vendors to design transceivers to the same specifications reducing risk for vendors and operators, increasing flexibility, and accelerating the introduction of new technology. Exemplary MSAs include XFP, XPAK, XENPAK, X2, XFP-E, SFP, and SFP+. Additionally, new MSAs are emerging to address new services and advanced technology. Each MSA defines the transceiver's mechanical characteristics, management interfaces, electrical characteristics, optical characteristics, and thermal requirements. Because of MSA specifications, MSA-compliant transceivers are standardized among equipment vendors and network operators to support multiple sources for pluggable transceivers and interoperability. As such, MSA-compliant transceivers have become the dominant form of transmitters and receivers in the industry.

Advantageously, MSA-compliant pluggable transceivers ensure engineering re-use and compatibility between various applications and the physical media dependent transceivers. Further, equipment vendors realize streamlined manufacturing and inventory control by removing wavelength specific decisions from the manufacturing process. For example, all line cards are manufactured the same, and the MSA-compliant transceiver module with the desired wavelength (e.g. 850 nm, 1310 nm, 1550 nm, dense wave division multiplexed (DWDM), etc.) is used as a function of the specific application or development configuration. Network operators and service providers have adopted MSA-compliant transceivers to reduce sparing costs. Further, significant cost reductions are realized by MSA standardization of MSA-compliant transceivers because of multiple independent manufacturing sources.

The MSA specifications tightly define the mechanical characteristics, management interfaces, electrical characteristics, optical characteristics, and thermal requirements of pluggable transceivers. However, the MSA specifications, such as in the case of SFP, SFP+, etc., do not specify how the pluggable transceivers are ejected from a host device. The SFP transceiver is specified by a MSA from the SFF committee (available at www.sffcommittee.com). The SFP was designed after the gigabit interface converter (GBIC) interface, and allows greater port density (number of transceivers per inch along the edge of a mother board) than the GBIC, which is why SFP is also known as mini-GBIC. The related Small Form Factor (SFF) transceiver is similar in size to the SFP, but is soldered to the host board as a pin through-hole device, rather than plugged into an edge-card socket. Small form-factor pluggable transceivers offer a great deal of flexibility in limited spatial constraints. The ability to densely populate such transceivers is highly marketable for to add system capacity.

MSAs, such as the SFP MSA, identify features that must be present with respect to an ejector methodology. The ejector is a mechanism to add/remove a pluggable transceiver from a host system. Conventional designs for ejectors utilize the enclosure side with either a tabbed or bail latch ejector system. Tabbed and single-arm ejector designs limit the ejector's accessibility in that the ejector can only be engaged from one direction thereby limiting the ability to densely populate modules. Bail-style ejectors include an arm that folds over the front of the transceiver that engages an ejection actuator. A key disadvantage of bail-style ejectors is that they require the user to disconnect any cables or fibers connected to the module prior to actuation. Other disadvantages of bail-style ejector systems are their complexity, cost, and their inability to work with longer neck connector styles.

Thus an improved ejector methodology is needed for pluggable transceivers, such as the SFP transceiver, that allows ease of access, supports high density, and allows ejection with connected cables.

BRIEF SUMMARY OF THE INVENTION

In various exemplary embodiments, the present invention relates to a novel ejector apparatus for pluggable transceivers, such as transceivers defined by multi-source agreements (MSAs) including SFP, SFP+, XFP, and the like. The ejector apparatus utilizes a shrouded design where the ejector apparatus encapsulates the top, sides, and bottom of a pluggable transceiver thereby allowing an operator to grasp any side of the ejector apparatus to actuate engagement prongs. In keeping with MSA guidelines, the ejector apparatus utilizes prongs to disengage a locking mechanism in order for the kick out springs to release the module. Advantageously, the ejector apparatus enables high density placement of corresponding transceivers, allows access from all sides of the transceiver for ejection, and allows cables to remain connected to the transceiver during ejection.

In an exemplary embodiment of the present invention, an ejector apparatus for a transceiver includes a top side, a bottom side, a left side, and a right side defining a hollow interior, wherein the hollow interior is shaped to fit a front portion of the transceiver; one or more notches in the hollow interior operable to slidingly engage one or more channels in the front portion of the transceiver; engagement prongs disposed on one of the top side, the bottom side, the left side, and the right side, wherein the engagement prongs are operable to disengage a latch on the transceiver from a latch opening in a cage thereby disengaging the transceiver from the cage. Optionally, the ejector apparatus further includes a retention plate disposed on the transceiver at a transmit and receive interface, wherein the retention plate is operable to prevent the one or more notches from exiting the one or more channels thereby locking the ejector apparatus on the transceiver. The ejector apparatus can further include one or more connector locks disposed over the transmit and receive interface to lock the retention plate on the transceiver. Alternatively, the ejector apparatus further includes flanges on the engagement prongs, wherein the flanges are operable to engage notches in one of the one or more channels thereby locking the ejector apparatus on the transceiver. The ejector apparatus can further include a plurality of ridges on each of the top side, the bottom side, the left side, and the right side for enabling an operator to grip the ejector apparatus from any side. Optionally, the transceiver includes a small form factor pluggable transceiver, and the engagement prongs are disposed on the bottom side, and responsive to sliding the engagement prongs to an engaged position, the engagement prongs are operable to disengage the latch including a latch boss from the latch opening. The ejector apparatus further includes a transmit and receive interface on the transceiver; and one or more cables attached to the transmit and receive interface; wherein the ejector apparatus is slid to disengage the transceiver from the cage without removing the one or more cables. Optionally, each of the top side, the bottom side, the left side, and the right side are formed from a single mold. The transceiver can be manufactured separate from the ejector apparatus.

In another exemplary embodiment of the present invention, a transceiver with a shrouded ejector apparatus includes a housing with a front portion; transmit and receive interfaces disposed to the front portion; the shrouded ejector apparatus slidingly engaged to the front portion, wherein the shrouded ejector apparatus encapsulates all sides of the front portion such that a user can grasp any side of the shrouded ejector apparatus; and engagement prongs disposed to the shrouded ejector apparatus. The engagement prongs are operable to disengage a latch disposed to the housing from a latch opening in a cage thereby disengaging the transceiver from the cage. The transceiver further includes one or more channels in the front portion; and one or more rails disposed to the shrouded ejector operable to slide through the one or more channels. Optionally, the transceiver further includes a retention plate disposed to the housing at the transmit and receive interfaces, wherein the retention plate is operable to prevent the one or more rails from exiting the one or more channels thereby locking the shrouded ejector apparatus on the transceiver. The transceiver can further include one or more connector locks disposed over the transmit and receive interfaces to lock the retention plate on the transceiver. Alternatively, the transceiver further includes flanges on the engagement prongs, wherein the flanges are operable to engage notches in one of the one or more channels thereby locking the shrouded ejector apparatus on the transceiver. The transceiver can include a small form factor pluggable transceiver, and the engagement prongs are disposed on a bottom side of the shrouded ejector apparatus, and responsive to sliding the engagement prongs to an engaged position, the engagement prongs are operable to disengage the latch including a latch boss from the latch opening. The transceiver further includes one or more cables attached to the transmit and receive interfaces; wherein the shrouded ejector apparatus is slid to disengage the transceiver from a cage without removing the one or more cables.

In yet another exemplary embodiment of the present invention, a method of assembling a transceiver with an ejector apparatus includes providing an assembled transceiver with one or more channels in a front portion of the transceiver; providing an ejector apparatus with one or more notches; sliding the ejector apparatus over the front portion of the transceiver engaging the one or more notches to the one or more channels; and retaining the ejector apparatus to the transceiver by performing one of locking a retention plate over the front portion thereby preventing the one or more notches from exiting the one or more channels and snapping engagement prongs to channel notches in one of the one or more channels.

BRIEF DESCRIPTION OF THE DRAWINGS

The present invention is illustrated and described herein with reference to the various drawings, in which like reference numbers denote like method steps and/or system components, respectively, and in which:

FIG. 5 is a top view of the SFP transceiver assembly with a self-contained ejector apparatus according to an exemplary embodiment of the present invention;

FIG. 6 is a bottom view of the SFP transceiver assembly with the self-contained ejector apparatus according to an exemplary embodiment of the present invention;

DETAILED DESCRIPTION OF THE INVENTION

In various exemplary embodiments, the present invention relates to a novel ejector apparatus for pluggable transceivers, such as transceivers defined by multi-source agreements (MSAs) including SFP, SFP+, XFP, and the like. The ejector apparatus utilizes a shrouded design where the ejector apparatus encapsulates the top, sides, and bottom of a pluggable transceiver thereby allowing an operator to grasp any side of the ejector apparatus to actuate engagement prongs. In keeping with MSA guidelines, the ejector apparatus utilizes prongs to disengage a locking mechanism in order for the kick out springs to release the module. Advantageously, the ejector apparatus enables high density placement of corresponding transceivers, allows access from all sides of the pluggable transceiver for ejection, and allows cables to remain connected to the transceiver during ejection.

The ejector apparatus of the present invention is illustrated herein with reference to an SFP MSA-compliant pluggable transceiver. SFP is defined in the INF-8074i Specification for SFP (Small Form factor Pluggable) Transceiver, Rev 1.0, May 12, 2001 from the SFF Committee, the contents of which are incorporated in full by reference herein. Those of ordinary skill in the art will recognize the present invention contemplates use of the novel ejector apparatus with any ejectable transceiver, i.e. pluggable transceiver, including and not limited to XFP, XPAK, XENPAK, X2, XFP-E, SFP, and SFP+. The present invention includes a shrouded design such that the ejector apparatus surrounds a front of the transceiver allowing the operator to grasp any portion of the ejector apparatus to engage or disengage the ejector apparatus from a locking mechanism.

Figure 1:
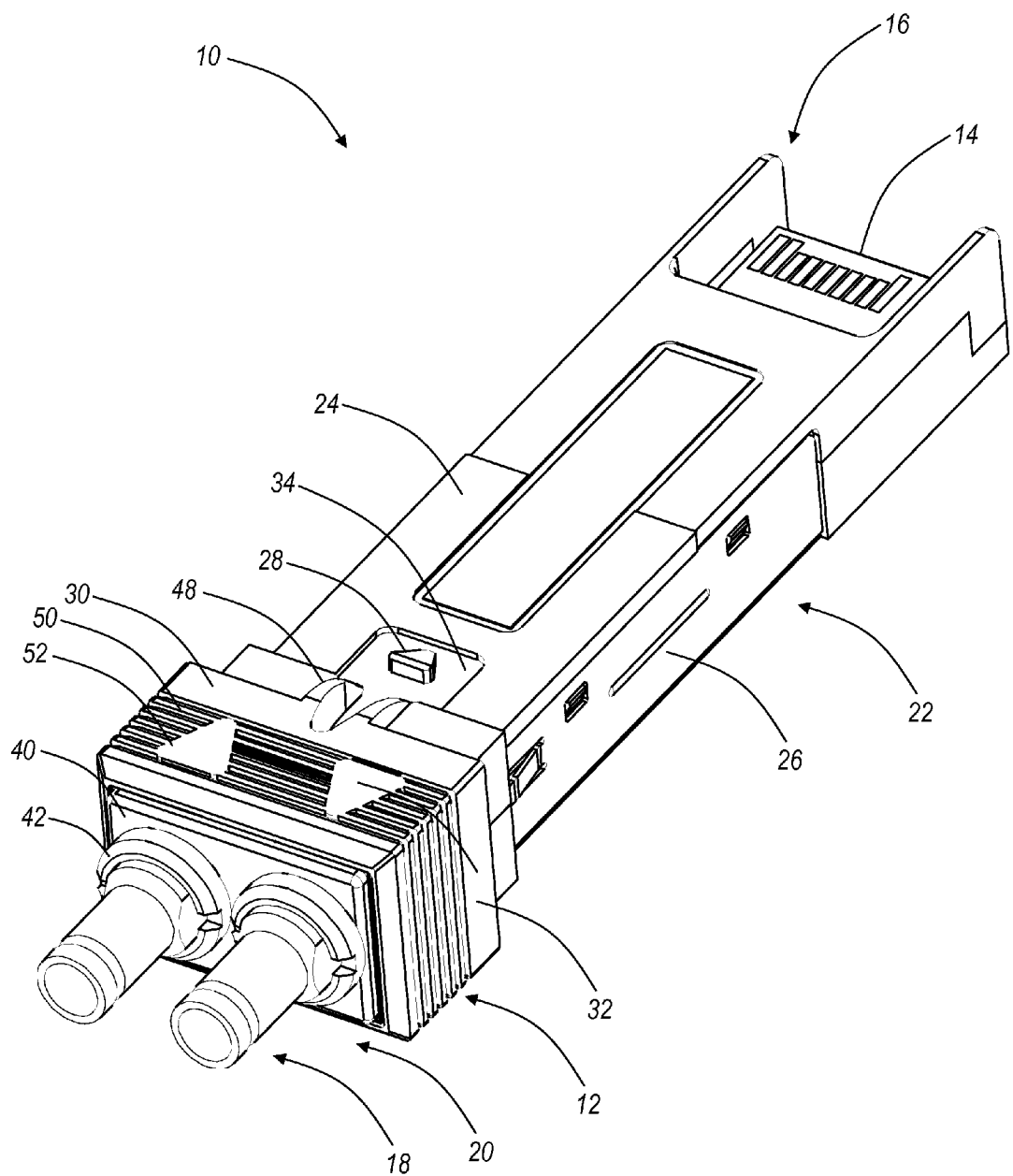
FIG. 1 is a perspective view of a SFP transceiver assembly with an ejector apparatus in a disengaged position according to an exemplary embodiment of the present invention.
Figure 2:
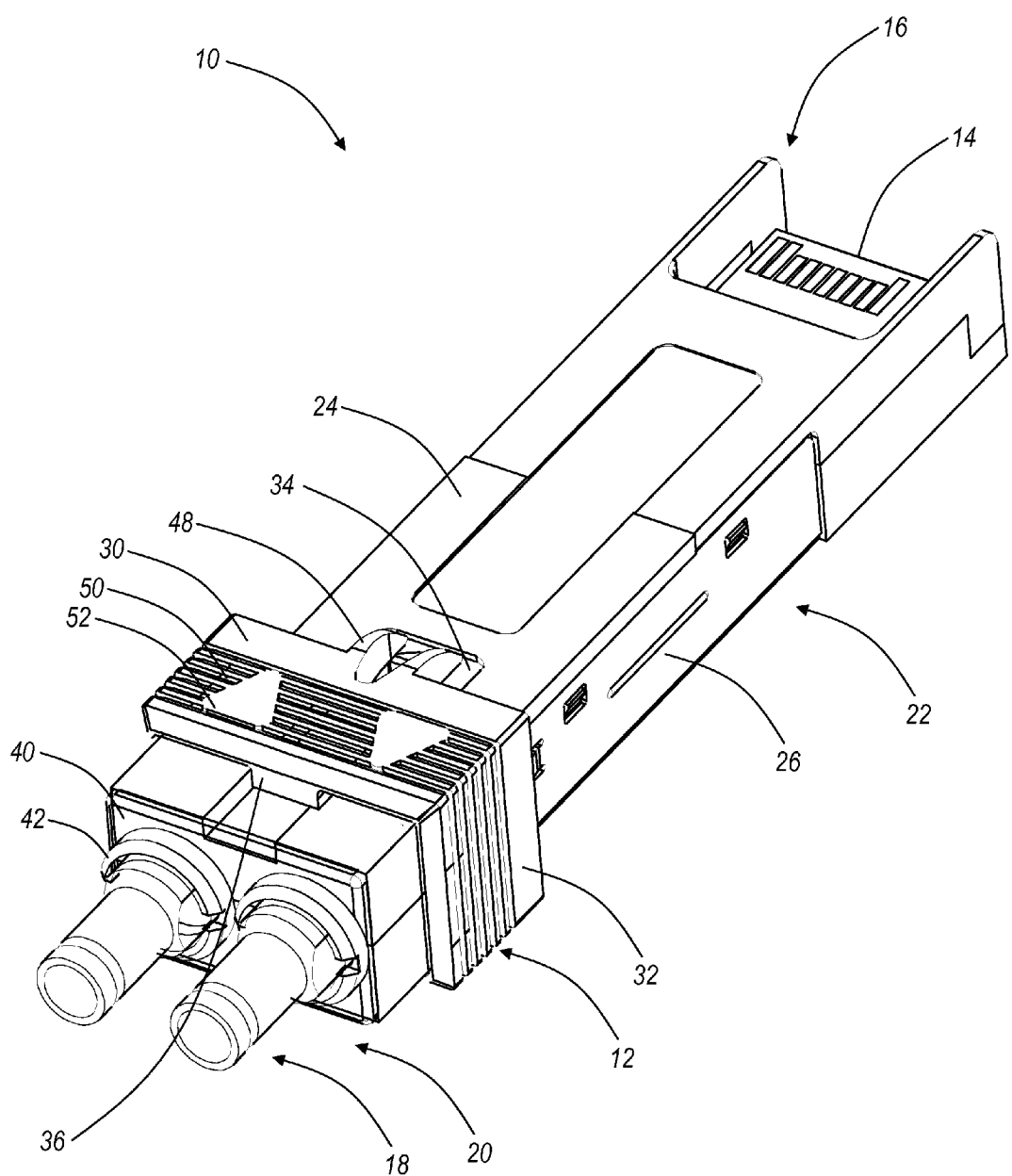
FIG. 2 is a perspective view of the SFP transceiver assembly of FIG. 1 with the ejector apparatus in an engaged position according to an exemplary embodiment of the present invention.

Referring to FIGS. 1 and 2, a SFP transceiver assembly 10 is illustrated with an ejector apparatus 12 in a disengaged (FIG. 1) and an engaged position (FIG. 2) according to an exemplary embodiment of the present invention. The transceiver assembly 10 includes a printed circuit board (PCB) 14 at one end 16 connected to a transmit/receive interface 18 at an opposite end 20. The transceiver assembly 10 is configured to plug the end 16 into a cage (not shown) that is disposed on a host device, e.g. a motherboard, line card, etc. For example, the SFP cage is defined in Table 4 and FIGS. 7A and 7B of the SFP MSA specification. The PCB 14 includes connectors that mate with corresponding connectors on the host device. The transceiver assembly 10 includes a housing 22 that substantially contains the PCB 14. The housing 22 includes a substantially rectangular shape (as defined in the SFP MSA specification) and includes a bottom side 24, a top side spaced apart from the bottom side 24 (not shown), a first side 26, and a second side spaced apart from the first side 26 (not shown).

The bottom side 24 of the housing 22 includes a latch boss 28 that is a triangular shaped protrusion or notch in the housing 22. The latch boss 28 is operable to engage a similarly shaped latch opening in the cage, i.e. the latch boss 28 snaps into the latch opening thereby locking the transceiver assembly 10 in the cage. Specifically, an operator inserts the transceiver assembly 10 into the cage until the latch boss 28 snaps in place with the corresponding latch opening. Conversely, ejecting the transceiver assembly 10 requires disengaging the latch boss 28 from the latch opening and applying a force on the housing 22 through kick-out springs in the cage.

The present invention includes the ejector apparatus 12 at the end 20 slidingly engaged to the housing 22 at the end 20. Note, the housing 22 includes a larger rectangular shape at the end 20 from the end 16 (based on the MSA specifications). The ejector apparatus 12 includes a slightly larger substantially rectangular shape matching the shape of the housing 22 at the end 20 such that the ejector apparatus 12 fits around the housing 22 at the end 20. The ejector apparatus 12 includes a bottom side 30, a top side spaced apart from the bottom side 30 (not shown), a first side 32, and a second side spaced apart from the first side 32 (not shown). The bottom side 30 and top side are disposed to the corresponding bottom side 24 and top side on the housing 22. The first side 32 and the second side are disposed to the corresponding first side 26 and second side on the housing 22.

The ejector apparatus 12 is configured to slide from the end 20 to the latch boss 28. Specifically, the bottom 24 of the housing 22 includes a channel 34 that defines the distance the ejector apparatus 12 can slide along the housing 22. The ejector apparatus 12 includes a notch 36 (illustrated in FIG. 2) that slidingly engages the channel 34. The end 20 includes a retention plate 40 disposed to the housing 22. The retention plate 40 is secured to the housing 22 through interface connector rings 42, and the retention plate 40 is configured to hold the ejector apparatus 12 on the transceiver assembly 10 through the notch 36 and another notch 44 (illustrated in FIG. 3). The notches 36, 44 prevent the ejector apparatus 12 from coming off the housing 22.

To engage and disengage the latch boss 28 from the latch opening, the ejector apparatus 12 includes engagement prongs 48 that extend out from the bottom side 30 of the ejector apparatus 12. The engagement prongs 48 include a curved shape that enable the engagement prongs 48 to slide through the channel 34 between the housing 22 and the cage. Accordingly, the engagement prongs 48 disengage the latch boss 28 from the latch opening thereby unlocking the transceiver assembly 10 from the cage. Once unlocked, the kick-out springs in the cage assist in removing the transceiver assembly 10 from the cage. Note, the ejector apparatus 12 with the engagement prongs 48 is fully within SFP MSA guidelines as it utilizes prongs to disengage the locking mechanism in order for the kick out springs to release the transceiver assembly 10.

The ejector apparatus 12 also includes a plurality of ridges 50 for assisting an operator in gripping the ejector apparatus 12 and visual indicators 52 to show the operator the direction of motion. Specifically, the ejector apparatus 12 fully encases the transceiver assembly 10 and the operator can grasp any of the sides of the ejector apparatus 12 to engage/disengage the transceiver assembly 10 from the cage. The ejector apparatus 12 can be constructed of plastic or other suitable material. As such, the ejector apparatus 12 is cost effective versus other disengagement mechanisms (bail-style, latch, etc.). Also, cables connected to the transmit/receive interface 18 do not need to be removed when removing the transceiver assembly 10 with the ejector apparatus 12.

FIG. 1 illustrates the ejector apparatus 12 in a disengaged position. Here, the transceiver assembly 10 is either plugged into a cage or not installed yet. The ejector apparatus 12 is positioned at the retention plate 40. FIG. 2 illustrates the ejector apparatus 12 in an engaged position. Here, the transceiver assembly 10 is plugged into a cage, and an operator has grasped the ejector apparatus 12 and exerted a force to move the ejector apparatus 12 away from the retention plate 40. The engagement prongs 48 are operable to disengage the latch boss 28 from the cage such that the transceiver assembly can be removed. Note, FIGS. 1 and 2 both illustrate bottom perspective views of the transceiver assembly 10 to show the engagement of the engagement prongs 48 with the latch boss 28.

Figure 3:
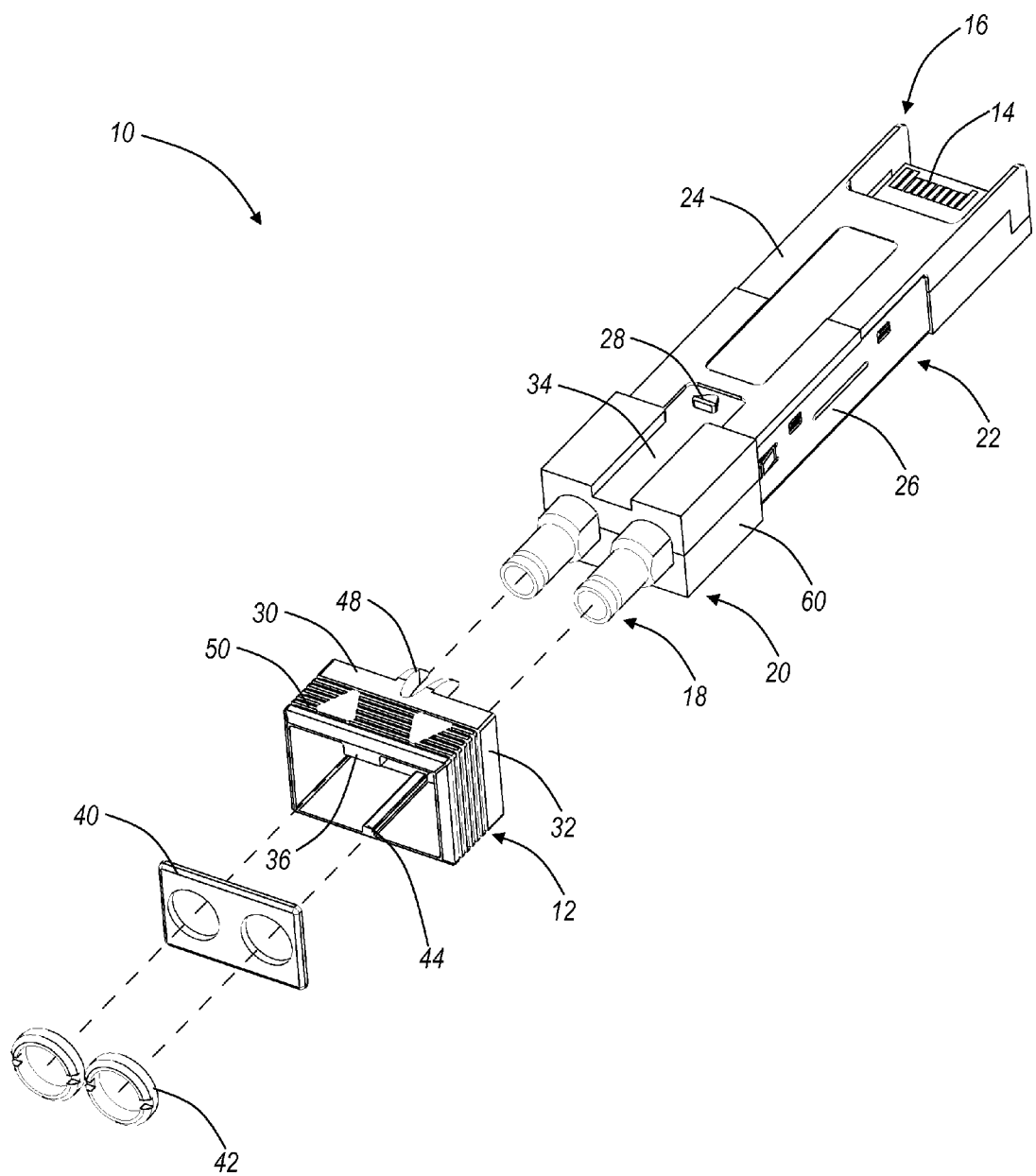
FIG. 3 is a perspective view of the SFP transceiver assembly of FIG. 1 with the ejector apparatus, the retention plate, and connector rings disconnected from the transceiver assembly according to an exemplary embodiment of the present invention.

Referring to FIG. 3, the SFP transceiver assembly 10 is illustrated with the ejector apparatus 12, the retention plate 40, and the connector rings 42 disconnected from the housing 22 according to an exemplary embodiment of the present invention. The housing 22 includes the end 16 where the PCB 14 is exposed and the end 20 where the transmit/receive interface 18 is exposed. At the end 20, the housing 22 includes a raised portion 60 that is larger than at the end 16 as defined in the SFP MSA in FIG. 1A. This raised portion 60 defines the channel 34 that the notch 36 in the ejector apparatus 12 slidingly engages.

From an assembly and manufacturing perspective, the SFP transceiver assembly 10 can be manufactured by first manufacturing the housing 22 with all the associated SFP components, e.g. PCB 14, transmit/receive interface 18, etc. Once the housing 22 is fully assembled, the ejector apparatus 12 can be added by sliding the ejector apparatus 12 such that the notch 36 engages the channel 34 and the notch 44 engages another channel (not shown) in the raised portion 60 on the top side of the housing 22. Once the ejector apparatus 12 is placed on the raised portion 60, the retention plate 40 is placed over the transmit/receive interface 18. The retention plate 40 holds the ejector apparatus 12 on the raised portion 60 by preventing the notches 36, 44 from exiting the channel 34 and the channel on the top side of the housing 22. The retention plate is locked in place with the connector rings 42 that are placed over the transmit/receive interface 18. Note, the transceiver assembly 10 is illustrated with video transmit/receive interfaces 18, i.e. coaxial cable connectors. Those of ordinary skill in the art will recognize that the connector rings 42 can be shaped differently to accommodate other transmit/receive interfaces 18, such as Ethernet, Optical LC connectors, Coax connectors, and the like.

Figure 4:
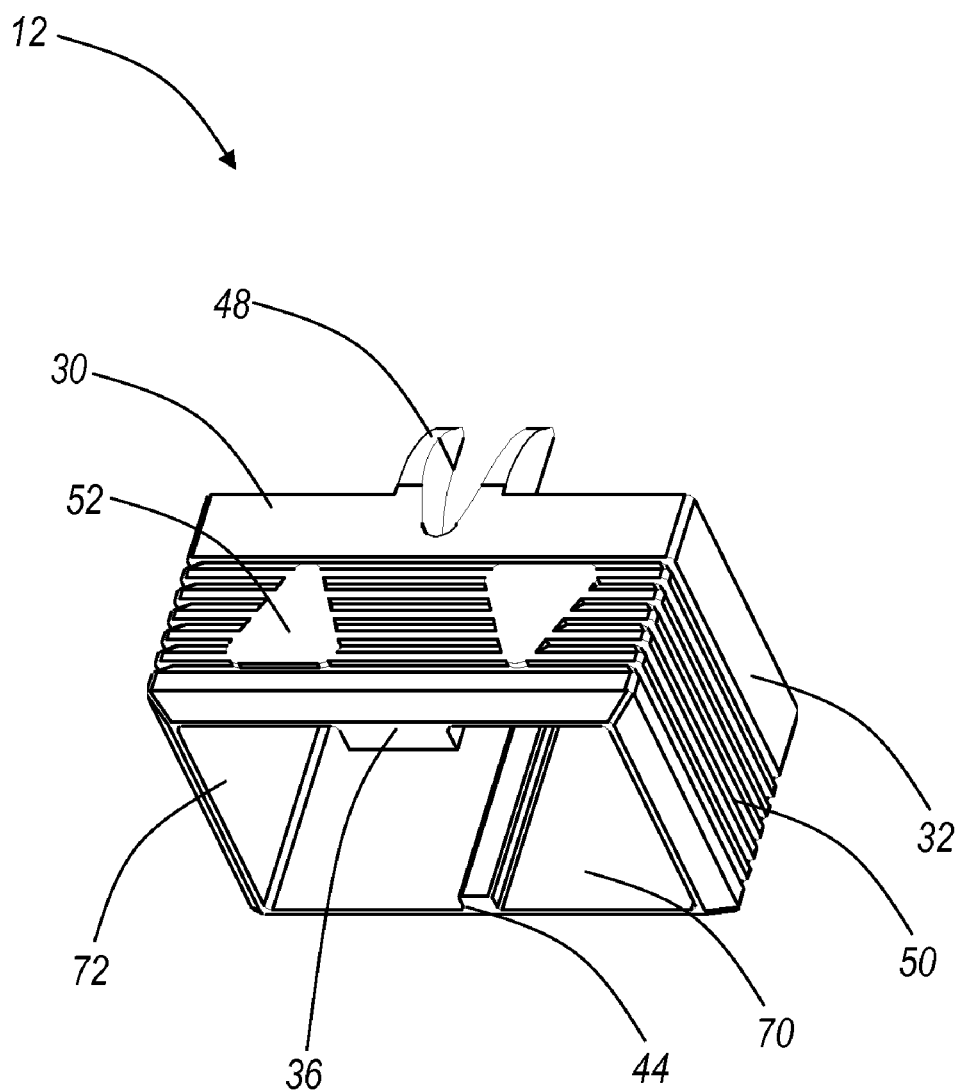
FIG. 4 is a perspective view of the ejector apparatus illustrated separate from the SFP transceiver assembly according to an exemplary embodiment of the present invention.

Referring to FIG. 4, the ejector apparatus 12 is illustrated separate from the SFP transceiver assembly 10 according to an exemplary embodiment of the present invention. The ejector apparatus 12 includes a substantially rectangular shape matching the shape of the raised portion 60 of the housing 22. The ejector apparatus 12 includes the bottom side 30, a top side 70 spaced apart from the bottom side 30, a first side 32, and a second side 72 spaced apart from the first side 32. The bottom side 30 and top side are disposed to the corresponding bottom side 24 and top side on the housing 22. The first side 32 and the second side are disposed to the corresponding first side 26 and second side on the housing 22. The sides 30, 32, 70, 72 define a hollow interior of the ejector apparatus 12 that includes the notches 36, 44 and that engages the raised portion 60 of the housing 22. The notch 36 is disposed to the bottom side 30, and the notch 44 is disposed to the top side 70. Note, the notches 36, 44 can be integrally formed as part of the sides 30, 70. For example, the ejector apparatus 12 can be manufactured from a mold or the like. Advantageously, the ejector apparatus 12 is a single component that can be easily added to a complete housing 22 making assembly simple. Also, there is a cost advantage of the ejector apparatus 12 in relation to bail-style or latch systems and methods.

Referring to FIGS. 5-12, various perspective views illustrate the SFP transceiver assembly 10 with a self-contained ejector apparatus 80 according to an exemplary embodiment of the present invention. FIGS. 5-12 include the same transceiver assembly 10 with the housing 22 as illustrated in FIGS. 1-4 without the retention plate 40. Note, FIGS. 5-12 illustrate various components of the transceiver assembly that also can be utilized with the ejector apparatus 12 in FIGS. 1-4. The self-contained ejector apparatus 80 includes flanges 82 in the engagement prongs 48 that prevent the ejector apparatus 80 from exiting the channel 34. Note, the ejector apparatus 80 can otherwise include all of the components described herein with respect to the ejector apparatus 12. Advantageously, the ejector apparatus 80 removes the requirement for the additional retention plate 40 thereby reducing cost and assembly complexity. FIG. 5 is a top perspective view of the transceiver assembly 10. The housing 22 includes a top side 84, the bottom side 24 (shown in FIG. 6), the first side 26, and a second side 86. The raised portion 60 on the top side includes a channel 88 that engages the notch 44 in the ejector apparatus 80.

Figure 7:
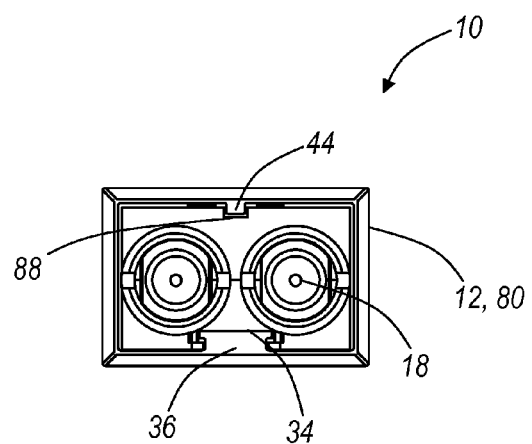
FIG. 7 is a front view of the SFP transceiver assembly with the self-contained ejector apparatus according to an exemplary embodiment of the present invention.
Figure 8:
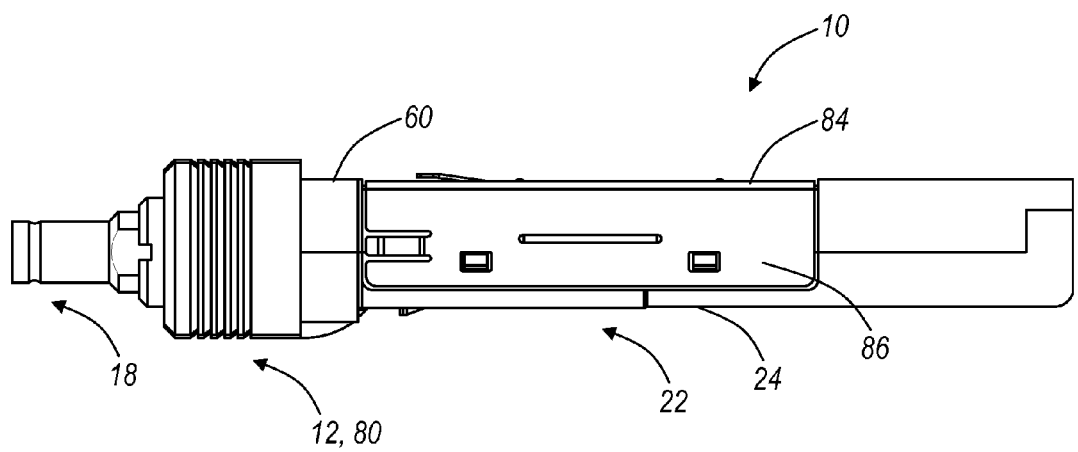
FIG. 8 is a side view of the SFP transceiver assembly with the self-contained ejector apparatus according to an exemplary embodiment of the present invention.

FIG. 6 is a bottom perspective view of the transceiver assembly 10. In this exemplary embodiment, the channel 34 includes a rectangular opening 90 (shown in FIGS. 9 and 11) that opens to a larger opening 92 thereby defining notches 94 in the channel 34. The notches 94 are operable to prevent the ejector apparatus 80 from coming off the raised portion 60 by engaging and being stopped by the notches 94. Similar to the ejector apparatus 10, the ejector apparatus 80 includes the engagement prongs 48 that are operable to disengage the latch boss 28 from a corresponding latch opening in a cage to disengage the transceiver assembly 10 from the cage. FIG. 7 is a front perspective view of the transceiver assembly 10. In this view, the notches 36, 44 are shown engaged in the channels 34, 80. The ejector apparatus 80 cannot exit the channels 34, 80 due to the flanges 82 in the engagement prongs 48. Alternatively, FIG. 7 would illustrate the ejector apparatus 12 without the retention plate 40 installed, i.e. the ejector apparatus 12 can utilize the same notches 36, 44. FIG. 8 is a side perspective view of the transceiver assembly 10 with either ejector apparatus 12, 80.

Figure 9:
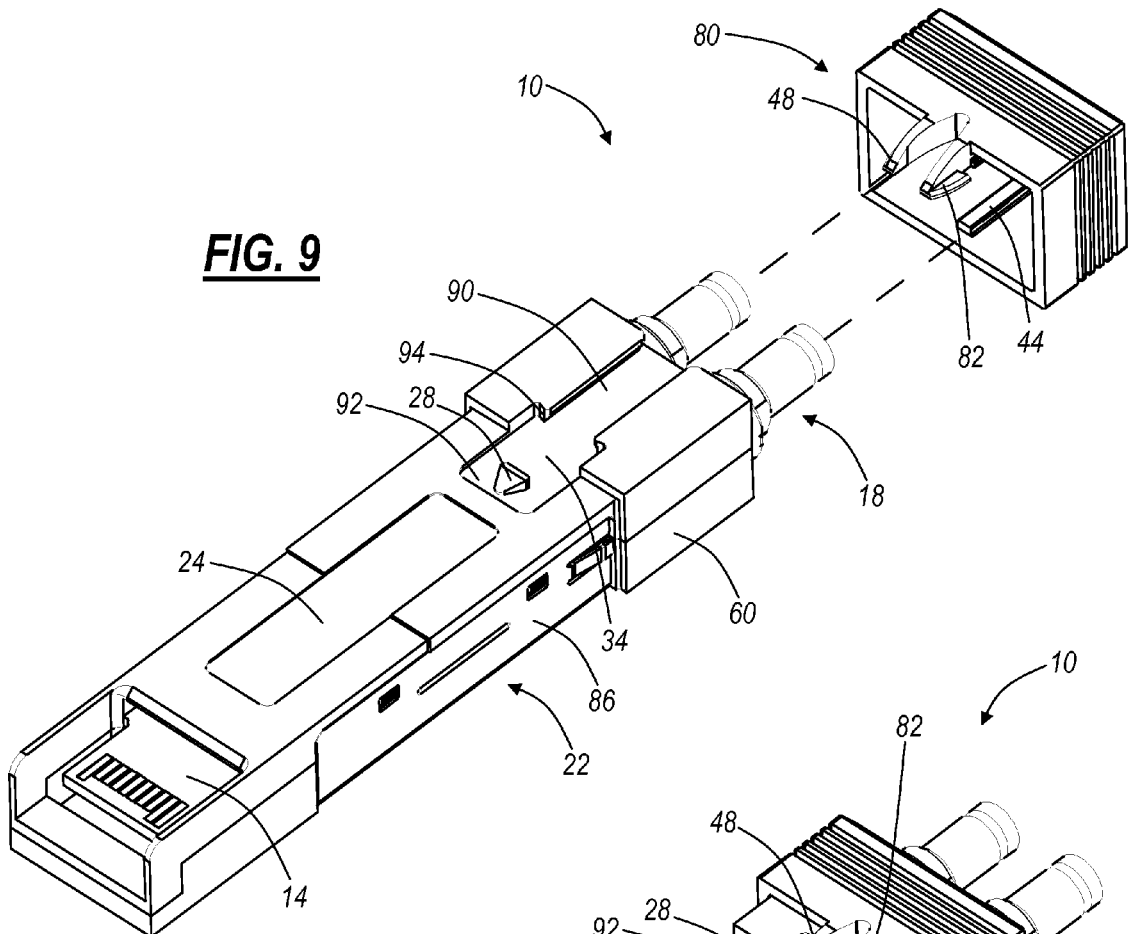
FIGS. 9-10 are perspective views of the SFP transceiver assembly with the self-contained ejector apparatus on and off the transceiver assembly according to an exemplary embodiment of the present invention.
Figure 10:
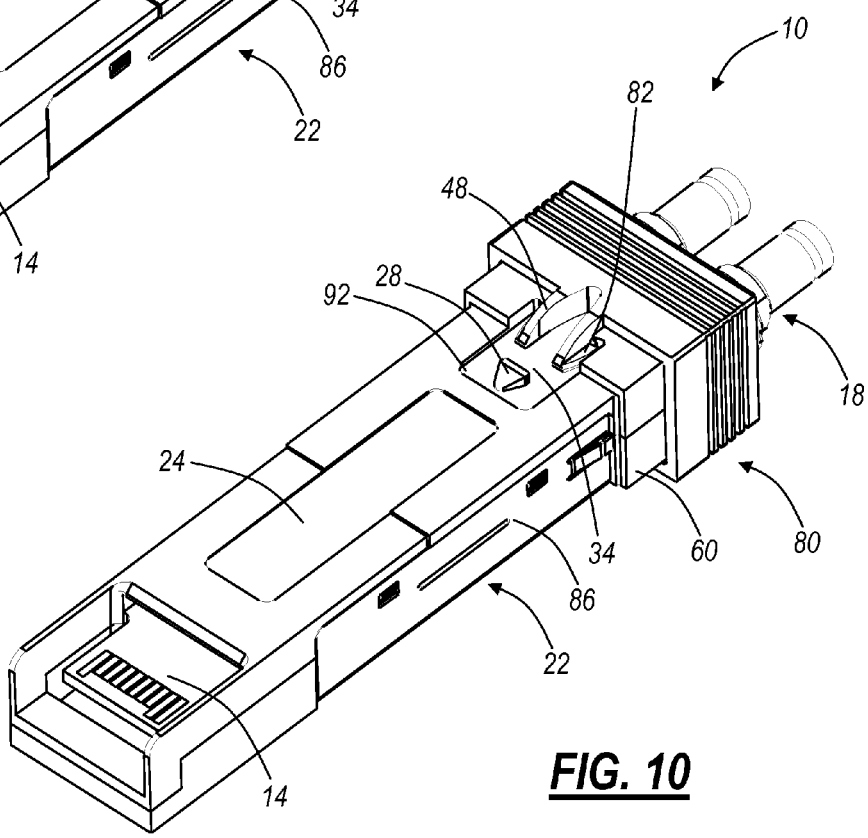
Figure 11:
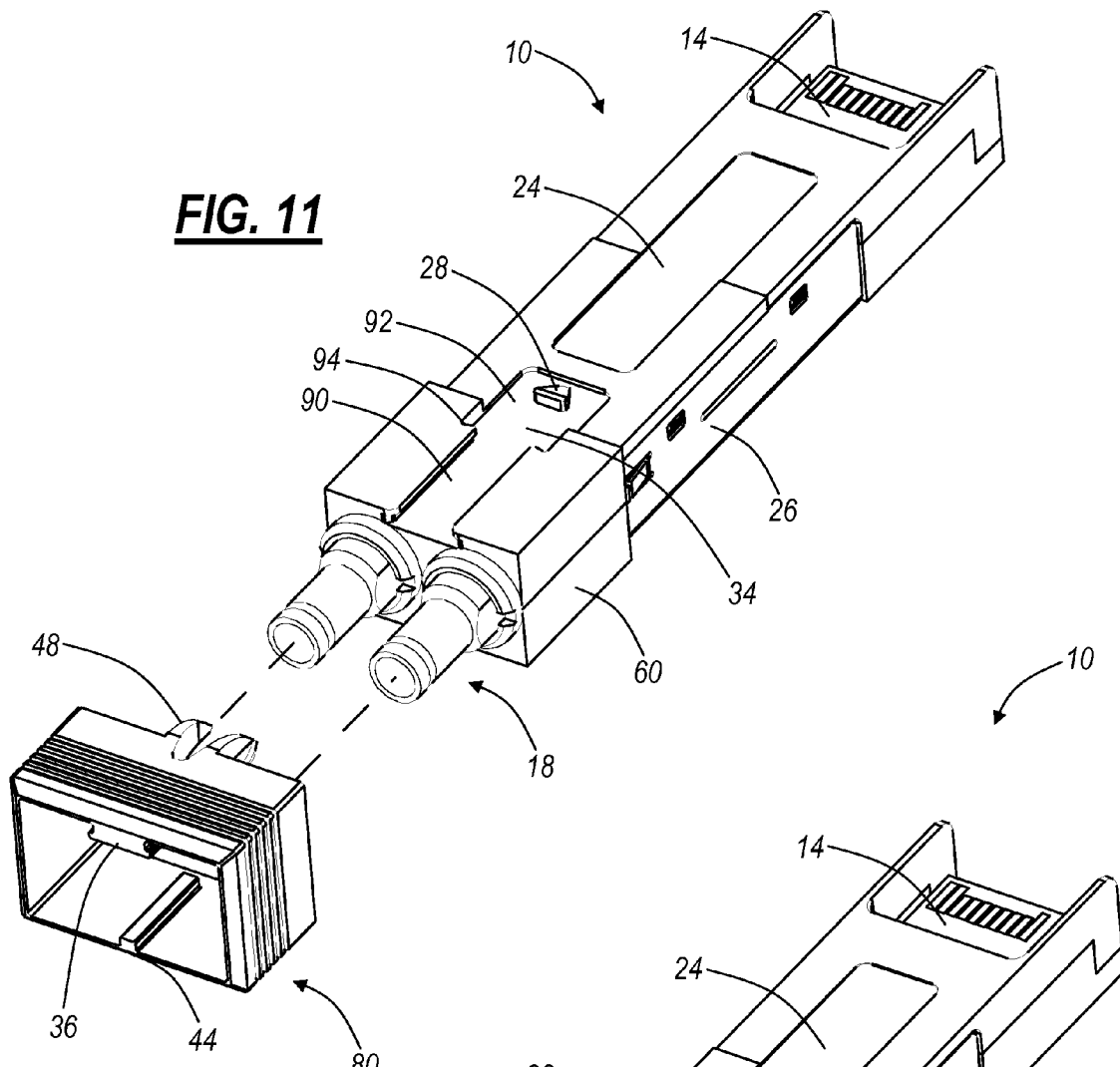
FIGS. 11-12 are additional perspective views of the SFP transceiver assembly with the self-contained ejector apparatus on and off the transceiver assembly according to an exemplary embodiment of the present invention.
Figure 12:
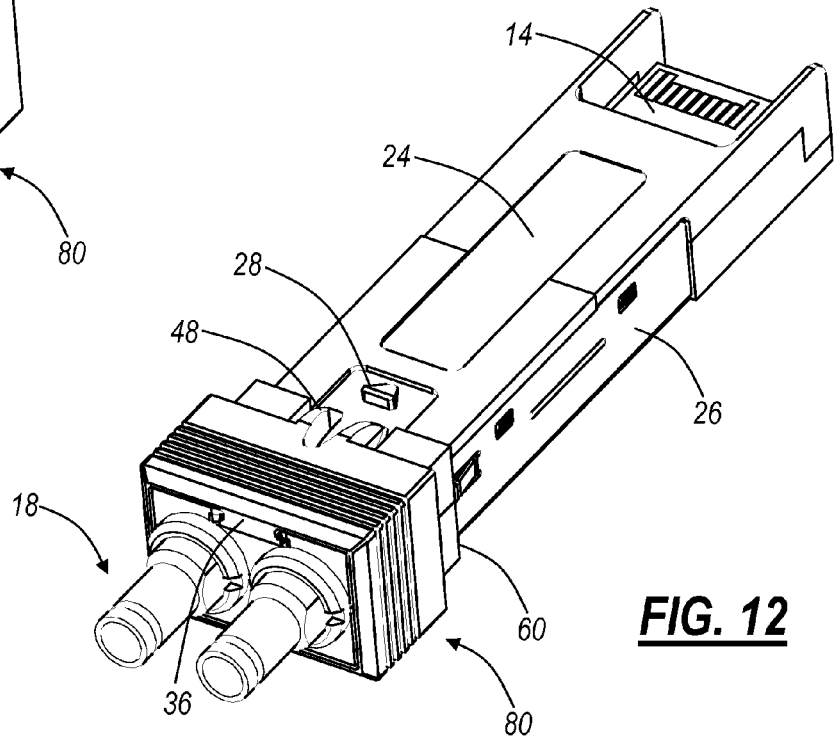

FIGS. 9-10 are perspective views of the SFP transceiver assembly 10 with the self-contained ejector apparatus 80 on and off the transceiver assembly 10. FIG. 9 illustrates the ejector apparatus 80 off of the transceiver assembly 10. As described above, in this exemplary embodiment, the channel 34 includes the rectangular opening 90 that opens to a larger opening 92 thereby defining notches 94 in the channel 34. The notches 94 are operable to engage and stop the flanges 82 on the engagement prongs 48. In FIG. 10, the ejector apparatus 80 is installed on the transceiver assembly 10. This is done by placing the ejector apparatus 80 over the raised portion 60 lining up the engagement prongs 48 through the rectangular opening 90. Note, the engagement prongs 48 can be flexible to allow them to fit through the rectangular opening 90, snapping back into place once in the larger opening 92 of the channel 34. FIGS. 11-12 are additional perspective views of the SFP transceiver assembly 10 with the self-contained ejector apparatus 80 on and off the transceiver assembly 10 showing a different view from FIGS. 9-10.

As described herein, the present invention includes an ejector system for pluggable devices, such as small form-factor, that is accessible from any exposed side of the device. The concept of the shrouded ejector is that it encapsulates the top, sides and bottom of the device such that the users' fingers can grasp by any side of the device to actuate the engagement prongs. Retention methods for such shrouded ejector styles can vary. Two notable methods described herein for holding the ejector onto the pluggable transceiver 10 are through the use of the retention plate 40 or self-contained in the ejector using prongs or flanges. The present invention is unique because it offers the ability to eject small form-factor pluggable modules from any side of their enclosure; therefore allowing the modules to be more densely populated. Shrouded style ejector systems, such as the ejector apparatus 12, 80, offer cost advantages over typical industry standards. Furthermore, shrouded ejectors do not require the user to disconnect any cables or fibers connected to the module prior to actuation.

Figure 13:
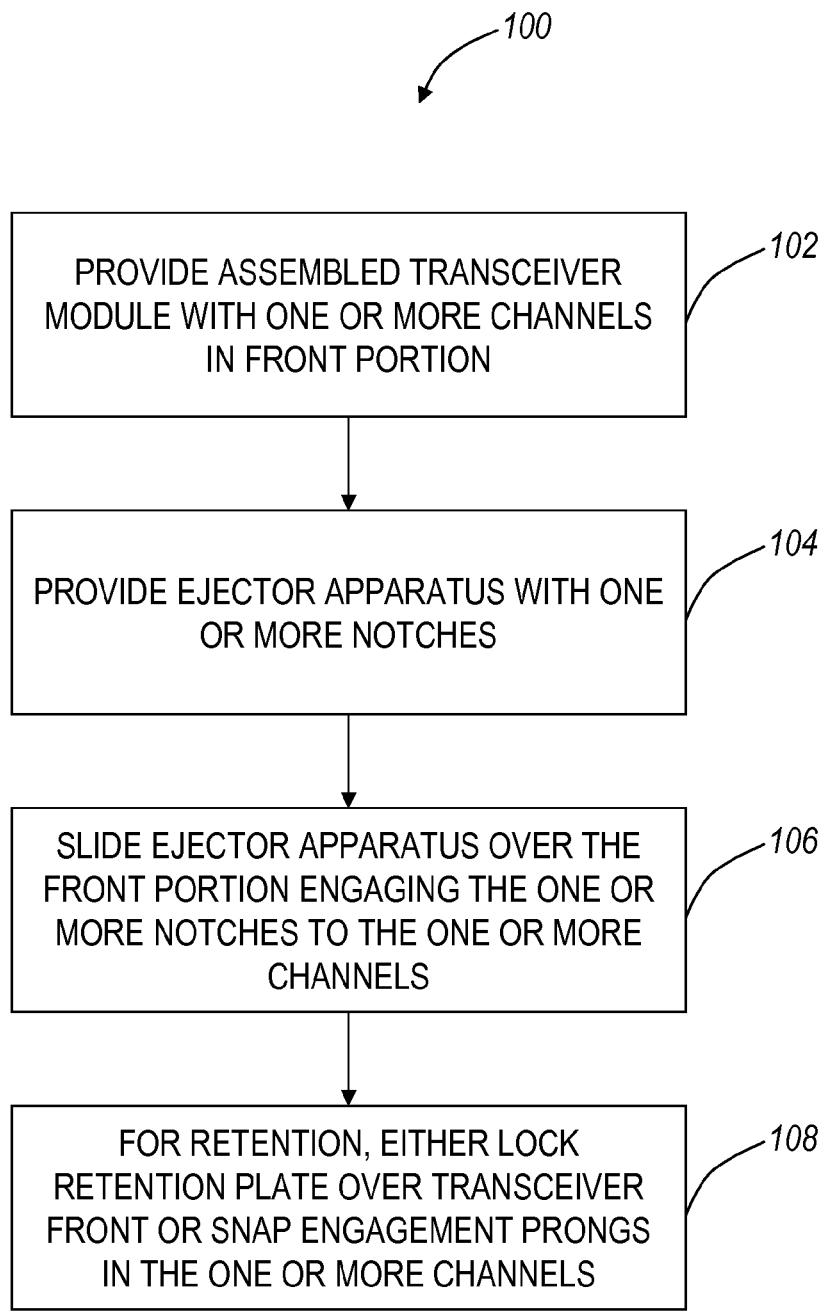
FIG. 13 is a flowchart of an assembly process for the SFP transceiver assembly according to an exemplary embodiment of the present invention.

Referring to FIG. 13, a flowchart is illustrated of an assembly process 100 for the transceiver assembly 10 with the ejector apparatus 12, 80 according to an exemplary embodiment of the present invention. The assembly process 100 starts by providing an already manufactured or assembled transceiver (step 102). Advantageously, the present invention can easily add the ejector apparatus described herein after manufacturing of the transceiver. For example, transceivers can include SFP, SFP+, XFP, X2, XENPAK, and the like. The transceiver is manufactured with one or more channels on a front portion (i.e., the portion with transmit and receive interfaces). A shrouded ejector apparatus is provided with one or more notches in an interior of the ejector apparatus (step 104). The ejector apparatus can be manufactured separate from the transceiver. For example, the ejector apparatus can include a hardened plastic or other suitable material. The ejector apparatus can be formed from a single mold as well for reduced cost.

The ejector apparatus is slid over the front portion of the transceiver such that the one or more notches in the ejector apparatus engage the one or more channels in the front portion of the transceiver (step 106). Note, the ejector apparatus includes engagement prongs the line up with one of the channels. These engagement prongs can also include flanges that must be bent inwards while sliding. For retention of the ejector apparatus, either a retention plate is locked over the front portion of the transceiver thereby closing the one or more channels or the flanges on the engagement prongs are snapped into one of the channels (step 108).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An ejector apparatus for a transceiver, comprising:
    a top side, a bottom side, a left side, and a right side defining a hollow interior, wherein the hollow interior is shaped to fit a front portion of a housing of the transceiver;
    one or more notches defined in any of the top side, the bottom side, the left side, and the right side operable to slidingly engage one or more channels in the front portion of the housing of the transceiver;
    engagement prongs disposed on one of the top side, the bottom side, the left side, and the right side, wherein the engagement prongs are operable to disengage a latch on the housing of the transceiver from a latch opening, and wherein the engagement prongs are selectively positioned one on either side of and at least partially around the latch; and
    flanges on the engagement prongs, wherein the flanges are operable to engage notches in one of the one or more channels thereby locking the ejector apparatus on the transceiver.

2. The ejector apparatus of claim 1, further comprising:
    a retention plate disposed on the transceiver at a transmit and receive interface, wherein the retention plate is operable to prevent the one or more notches from exiting the one or more channels thereby locking the ejector apparatus on the transceiver.

3. The ejector apparatus of claim 2, further comprising:
    one or more connector locks disposed over the transmit and receive interface to lock the retention plate on the transceiver.

4. The ejector apparatus of claim 1, further comprising:
    a plurality of ridges on each of the top side, the bottom side, the left side, and the right side for enabling an operator to grip the ejector apparatus from any side.

5. The ejector apparatus of claim 1, wherein the transceiver comprises a small form factor pluggable transceiver.

6. The ejector apparatus of claim 5, wherein the engagement prongs are disposed on the bottom side, and wherein responsive to sliding the engagement prongs to an engaged position, the engagement prongs are operable to disengage the latch comprising a latch boss from the latch opening.

7. The ejector apparatus of claim 1, further comprising:
    a transmit and receive interface on the transceiver; and
    one or more cables attached to the transmit and receive interface;
    wherein the ejector apparatus is slid to disengage the transceiver without removing the one or more cables.

8. The ejector apparatus of claim 1, wherein each of the top side, the bottom side, the left side, and the right side are formed from a single mold.

9. The ejector apparatus of claim 8, wherein the transceiver is manufactured separate from the ejector apparatus.

10. An ejector apparatus for a transceiver, comprising:
    a top side, a bottom side, a left side, and a right side defining a hollow interior, wherein the hollow interior is shaped to fit a front portion of a housing of the transceiver;
    one or more notches defined in any of the top side, the bottom side, the left side, and the right side operable to slidingly engage one or more channels in the front portion of the housing of the transceiver;
    engagement prongs disposed on one of the top side, the bottom side, the left side, and the right side, wherein the engagement prongs are operable to disengage a latch on the housing of the transceiver from a latch opening; and
    flanges on the engagement prongs, wherein the flanges are operable to engage notches in one of the one or more channels thereby locking the ejector apparatus on the transceiver.

* * * * *